March 7, 1944.  C. L. MARTIN  2,343,786
FLUID COUPLING
Filed July 18, 1941  3 Sheets-Sheet 1

INVENTOR
Charles L. Martin

March 7, 1944.  C. L. MARTIN  2,343,786
FLUID COUPLING
Filed July 18, 1941  3 Sheets-Sheet 2

INVENTOR
Charles L. Martin

March 7, 1944.  C. L. MARTIN  2,343,786
FLUID COUPLING
Filed July 18, 1941  3 Sheets-Sheet 3

INVENTOR
Charles L. Martin.

Patented Mar. 7, 1944

2,343,786

UNITED STATES PATENT OFFICE 2,343,786

FLUID COUPLING

Charles L. Martin, St. Louis, Mo.

Application July 18, 1941, Serial No. 402,937

8 Claims. (Cl. 60—54)

This invention relates to fluid couplings or clutches for transmitting power from a driving shaft to an axially aligned driven shaft, and more particularly to a means for transferring fluid to and from the coupling to render the coupling operative and inoperative.

Fluid couplings are well known and generally include a driving shaft and a driven shaft on the ends of which are secured wheels which have opposing vanes, blades or passages, and a fluid tight case or shell secured to one wheel and encasing the other wheel.

To render the coupling operative or inoperative for power or clutching purposes, it is common practice to deliver liquid to or withdraw liquid from the coupling by means of remote pumping mechanism.

The application of a fluid coupling on a motor vehicle necessitates the use of a clutch to facilitate changing from one gear ratio to another where no provision is made for varying the quantity of fluid in the coupling.

This invention contemplates a new and simplified combination of elements adapted to expedite the filling and emptying of the fluid coupling without the use of a remote pumping mechanism.

An object of the invention is to provide means for filling and emptying the coupling with such rapidity as to be desirable for use on a motor vehicle without additional clutch mechanism.

Another object is to provide means for emptying the coupling and stopping the driven shaft when the vehicle motor is idling.

Another object is to provide for rapidly filling the coupling when the driving shaft is accelerated.

Another object is to provide a constant atmospheric vent to the interior of the coupling.

A further object is to provide a stationary reservoir in close association with the rotating elements of the coupling.

A further object is to provide a stationary reservoir in open communication with the coupling at all times.

A further object is to provide means whereby the coupling may be rendered inoperative any time irrespective of the speed of the driven shaft.

Further objects and advantages will become apparent upon reference to the following specification and accompanying drawings, referring to which:

Figure 1:
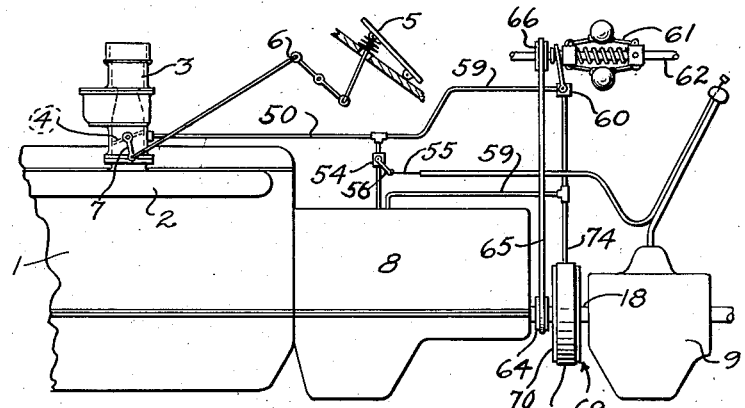
Fig. 1 is a side elevation of an internal combustion engine including an embodiment of the invention.

Numeral 1 indicates an internal combustion engine having an intake manifold 2 on which is mounted a carburetor 3 for supplying a combustible mixture to the engine. Throttle valve 4 located in the outlet portion of carburetor 3 is manually actuated through the accelerator pedal 5 intermediate linkage 6 and throttle arm 7.

Fluid coupling housing 8 surrounds the fluid coupling which is positioned between the engine 1 and the conventional gear transmission indicated at 9.

Figure 2:
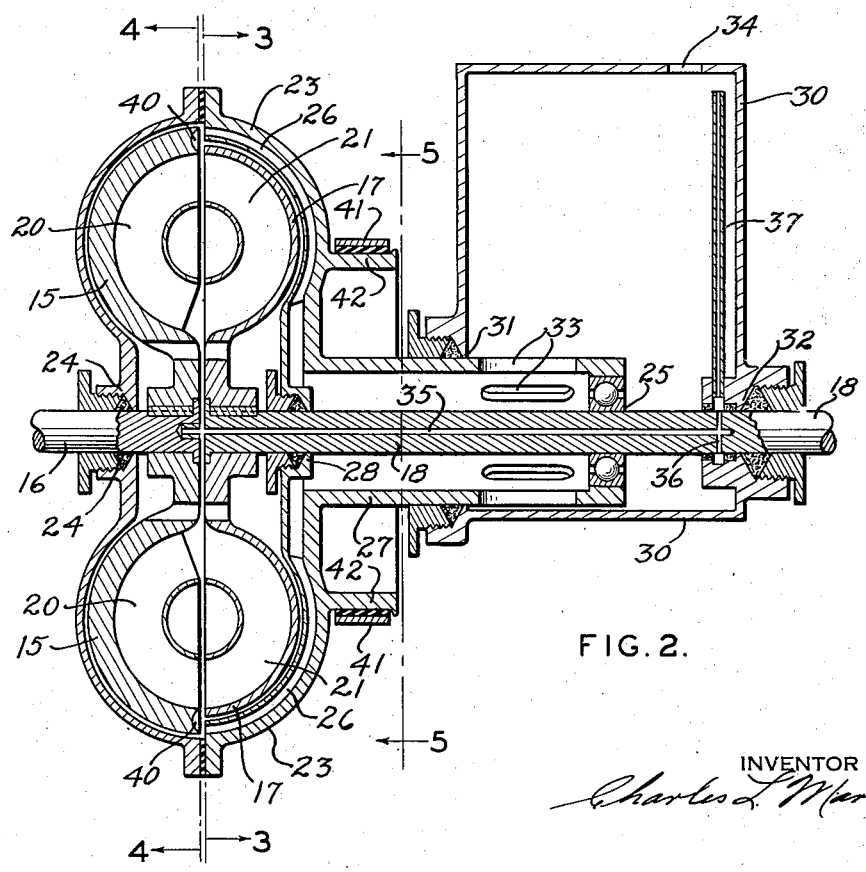
Fig. 2 is a sectional view of the fluid coupling.
Figure 3:
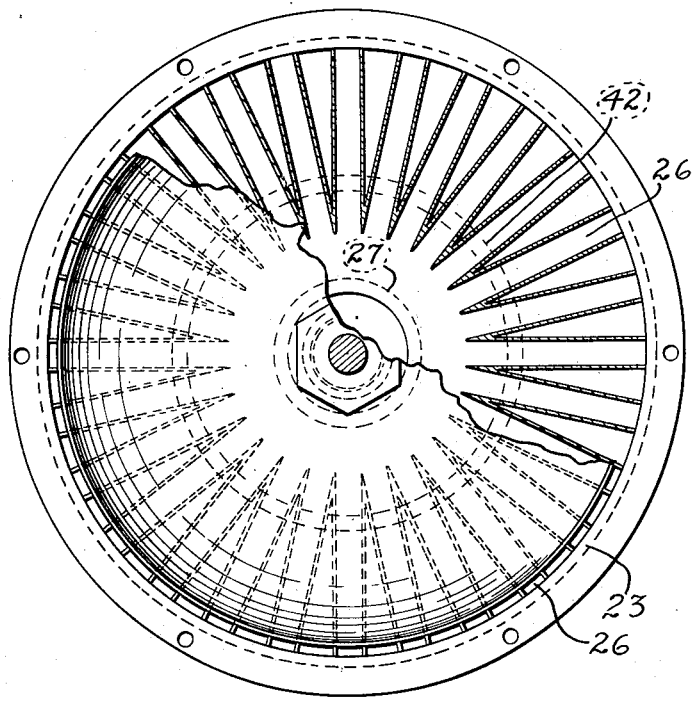
Fig. 3 is an end elevation of the rotatable shell taken substantially on line 3—3 in Fig. 2.
Figure 4:
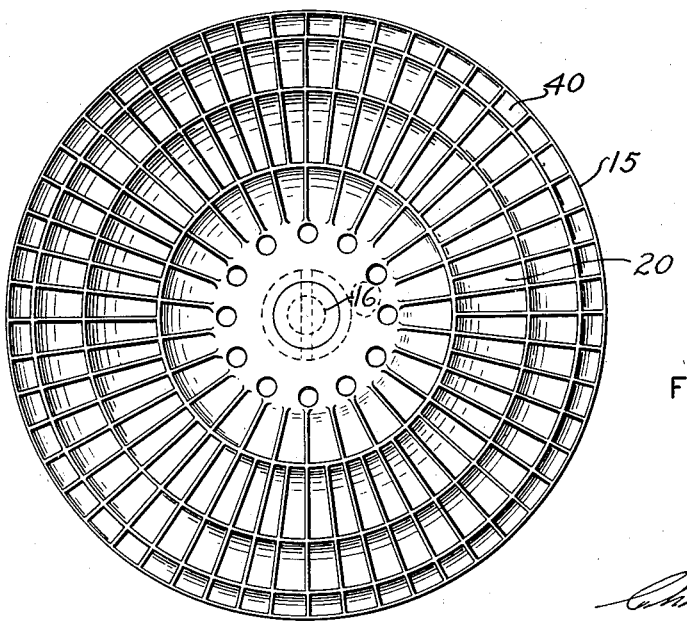
Fig. 4 is an end elevation of the impeller wheel taken substantially on line 4—4 in Fig. 2.

The fluid coupling and its associated elements can best be understood by referring to Figure 2 in which an impeller wheel 15 is secured to the end of engine crank shaft 16, and a turbine wheel 17 is secured to the end of a driven shaft 18. Wheels 15 and 17 are provided with series of opposing vanes 20 and 21, respectively, and are so juxtaposed that the impelling liquid effects the rotation of the turbine wheel 17 in response to the rotation of the impeller wheel 15.

A fluid tight shell or container 23 enclosing wheels 15 and 17 is rotatably mounted on crank shaft 16 at 24 and on driven shaft 18 at 25 and is free to rotate without transmitting power from the crank shaft to the driven shaft. Shell 23 is provided with conduits 26 which form a communication between the interior of the shell and the interior of the shell extension 27 which surrounds a portion of shaft 18 and the fluid seal 28 prevents fluid from shell extension 27 entering the coupling along the shaft 18.

A stationary fluid reservoir 30 supported on shell extension 27 at 31 and on shaft 18 at 32 is in open communication with the interior of extension 27 through the openings 33. Reservoir 30 is provided with an atmospheric vent indicated at 34.

An atmospheric vent for the coupling is necessary and is provided by the longitudinal duct 35 in shaft 18, cross duct 36 and a stationary conduit 37 in fluid reservoir 30.

For transferring fluid from the coupling to the reservoir and from the reservoir to the coupling a series of vanes 40 are provided in wheel 15 opposite the ends of conduits 26 and brake elements 41 are provided for frictionally engaging the brake drum 42 protruding from shell 23 for retarding or stopping the rotation of the shell.

Assuming that the brake elements 41 are disengaged and engine 1 is rotating crankshaft 16, impeller wheel 15 will, therefore, rotate turbine wheel 17 and shaft 18 and the vanes 40 opposing the ends of conduits 26 plus the skin friction of the fluid between the wheels and the shell will cause the shell to rotate.

Upon application of the brake elements 41, shell 23 ceases to rotate and takes on the function of the housing of a centrifugal pump and fluid in the coupling will be expelled through the conduits 26 to the reservoir 30 thereby severing all fluid communication between the impeller vanes 20 and the turbine wheel vanes 21 and the fluid will be retained in the reservoir 30 and shell extension 27 as well as in conduits 26 because of the pressure head in the reservoir. When the brake elements 41 are disengaged, impeller wheel 15 causes shell 23 to rotate and the shell then takes on the function of an impeller of a centrifugal pump and causes the fluid to flow from reservoir 30 to the coupling until the coupling is filled.

By this novel arrangement, the fluid coupling may be very rapidly emptied and filled without the use of remote pumping mechanism thereby facilitating its use in conjunction with a motor vehicle.

Figure 5:
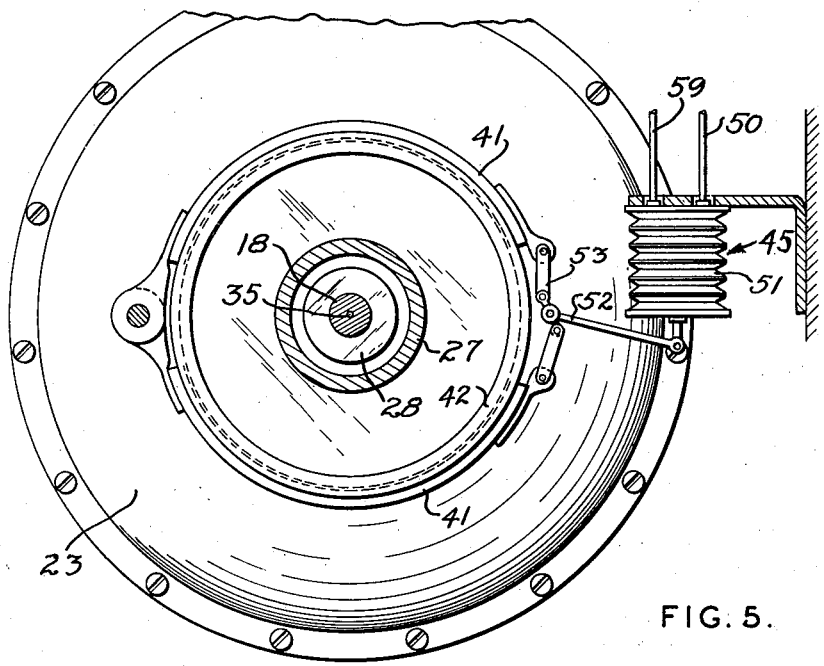
Fig. 5 is an end elevation of the brake mechanism taken substantially on line 5—5 in Fig. 2.

Eliminating the use of a frictional clutch for changing gears may be accomplished in a manner illustrated in Figs. 1 and 5. Conduit 50 communicating with the carburetor 3 at a point posterior to the throttle valve 4 leads to a suction actuated device 45 for causing brake elements 41 to apply pressure on brake drum 42. The suction device 45 includes a collapsible chamber 51 for actuating a brake lever 52 which, in turn, through toggle arrangement 53 causes brake elements 41 to frictionally engage brake drum 42 when the throttle vlave 4 is in closed position. A valve 54 interposed in conduit 50 is operated manually through a flexible cable 55 attached to the valve arm 56.

The suction device is so designed as to be operated only when a very high suction is reached as when the throttle valve is substantially closed and with the use of valve 54 the suction device is only operative when throttle valve 4 is closed and valve 54 is opened.

There is a time when it is necessary that the brake elements 41 be engaged when the throttle valve 4 and valve 54 are both in closed position, such as when the vehicle is not in motion and the engine is idling. This is accomplished by providing a by-pass conduit 59 around valve 54 in which a valve 60 is interposed and operated in response to the speed of driven shaft 18. The valve 60 is actuated by means of a governor device which is well known in the art and indicated at 61 on a shaft 62. The governor is driven by shaft 18 through the medium of pulley 64, belt 65 and pulley 66, and is so designed as to be operative at a very low shaft speed.

The air turbulence set up in the coupling when the coupling is emptied of fluid and the gear transmission is in neutral tends to rotate shaft 18. The brake device 69 on shaft 18 comprises a drum 70 and brake elements 71 actuated by a suction device (not shown) but similar to suction device 45 and supplied through conduit 74 leading from the by-pass conduit 59. By this arrangement shaft 18 is forcibly arrested against rotation to facilitate engaging the gears and is free to rotate when the throttle valve is opened.

While certain novel features of the invention have been shown and described and pointed out in the annexed claims, other modifications may appear to those skilled in the art and the exclusive use of all such modifications as come within the scope of the appended claims is contemplated.

I claim:

1. In a fluid coupling, a driving shaft, an impeller wheel secured to said driving shaft, a driven shaft, a turbine wheel secured to said driven shaft and cooperating with said impeller wheel to form a working chamber, a freely rotatable shell enclosing said wheels, means for braking said shell, a fluid reservoir, and passageways carried by said shell for conducting fluid from the periphery of said wheels to said reservoir when said shell is braked, said passageways being constructed and arranged to conduct fluid from said reservoir to said wheels when said shell is free to rotate and constituting the sole connection between said working chamber and said reservoir.

2. In a fluid coupling, a driving shaft, an impeller wheel secured to said driving shaft, a driven shaft, a turbine wheel secured to said driven shaft, said wheels having opposing vanes, a rotatable shell enclosing said wheels, a stationary fluid reservoir, conduits carried by said shell each with one end in communication with said reservoir, the other ends of said conduits opening into the interior of said shell, and vane portions on said impeller wheel opposing the conduit openings in said shell.

3. In a fluid coupling, a driving shaft, an impeller wheel secured to said driving shaft, a driven shaft, a turbine wheel secured to said driven shaft, said wheels having opposing vane structure, a freely rotatable shell enclosing said wheels, a fluid reservoir in open communication with the interior of said shell, brake means for controlling the rotation of said shell, and means for initiating the rotation of said shell when the brake is released comprising conduits carried by said shell having openings opposing the peripheral portion of the vane structure on said impeller wheel, said conduits being constructed and arranged to empty said shell of fluid when the rotation of said shell is braked and to fill said shell when said shell is free to rotate.

4. In a fluid coupling, a driving shaft, a vaned impeller wheel secured to said driving shaft, a driven shaft, a turbine wheel secured to said driven shaft, a freely rotatable shell enclosing said wheels, a fluid reservoir in open communication with the interior of said shell, brake means for controlling the rotation of said shell, means for initiating rotation of said shell when the brake is released comprising conduits carried by said shell having openings opposing the vanes of said impeller wheel, said conduits being constructed and arranged to empty said shell of fluid when the rotation of said shell is braked and to fill said shell when said shell is free to rotate, and means for constantly venting said reservoir and the interior of said shell to the atmosphere.

5. In a hydraulic power transmitting device, a driving shaft, an impeller wheel driven by said shaft, a turbine wheel, said wheels having opposing vane structure, a shaft driven by said turbine wheel, a rotatable fluid container enclosing said wheels, a series of fluid conduits carried by said fluid container, a fluid reservoir in communication with the interior of said container through said conduits and vane structure carried by said impeller wheel opposing one end of said conduits for impelling fluid therethrough toward said reservoir.

6. In a fluid coupling, impeller and turbine wheels having opposing vanes and forming a working chamber therebetween, vane structure on said impeller wheel protruding radially beyond the vanes on said turbine wheel, a rotatable casing enclosing said wheels, a brake for said casing, a reservoir, conduit means at least partly formed on the inner wall of said casing and extending from said reservoir to said protruding vane structure, said reservoir and said conduit means being arranged so that liquid is maintained in engagement with said protruding vane structure even when said casing is braked and said impeller wheel is rotating, so that upon release of said casing, the energy imparted to the liquid in said conduit means by said vane structure will cause rotation of said casing.

7. In a liquid coupling, opposing impeller and turbine wheels forming a working chamber therebetween, vanes on said impeller wheel protruding radially beyond said turbine wheel, a rotatable casing receiving said wheels, a brake for said casing, a reservoir, and vane structure on the inner wall of said casing forming conduit means for connecting said reservoir and said protruding vanes, said reservoir and said conduit means being located above the lower portion of said wheels so as to maintain liquid in engagement with the lowermost of said protruding vanes, even when said working chamber is evacuated during operation by braking of said casing, whereby upon release of said casing, said casing will be rotated by energy transmitted from said protruding vanes through the liquid in said conduit means.

8. In a liquid coupling, impeller and turbine wheels forming a working chamber therebetween, vane structure on said impeller wheel protruding radially beyond said turbine wheel, a rotatable casing enclosing said wheels, means to brake said casing, and a reservoir communicating with said casing and arranged to maintain liquid in said casing in contact with said protruding vane structure, even when said working chamber is evacuated, so that energy imparted to the liquid by said vane structure will cause rotation of said casing, when released, and consequent return of liquid into said working chamber.

CHARLES L. MARTIN.